(12) United States Patent
Ebihara

(10) Patent No.: US 11,694,475 B2
(45) Date of Patent: *Jul. 4, 2023

(54) SPOOFING DETECTION APPARATUS, SPOOFING DETECTION METHOD, AND COMPUTER-READABLE RECORDING MEDIUM

(71) Applicant: NEC Corporation, Tokyo (JP)

(72) Inventor: Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,623

(22) Filed: Nov. 1, 2021

(65) Prior Publication Data

US 2022/0237951 A1  Jul. 28, 2022

Related U.S. Application Data

(63) Continuation of application No. 16/964,877, filed as application No. PCT/JP2018/006561 on Feb. 22, 2018, now Pat. No. 11,200,436.

(51) Int. Cl.
*G06V 40/16* (2022.01)
*G06V 40/40* (2022.01)
(Continued)

(52) U.S. Cl.
CPC .......... *G06V 40/161* (2022.01); *G06V 10/141* (2022.01); *G06V 10/50* (2022.01);
(Continued)

(58) Field of Classification Search
None
See application file for complete search history.

(56) References Cited

U.S. PATENT DOCUMENTS 11,200,436 B2 * 12/2021 Ebihara .................. G06V 10/60
2010/0299530 A1 * 11/2010 Bell ........................ G06V 40/18
382/117

(Continued)

FOREIGN PATENT DOCUMENTS

JP   H11-339048 A    12/1999
JP   2006-099614 A    4/2006
(Continued)

OTHER PUBLICATIONS

International Search Report for PCT Application No. PCT/JP2018/006561, dated May 22, 2018.
(Continued)

*Primary Examiner* — Edward Park

(57) ABSTRACT

A spoofing detection apparatus comprises obtaining, from an image capture apparatus, a first image frame that includes the face of a subject person obtained when a light-emitting apparatus is emitting light and a second image frame that includes the face of the subject person obtained when the light-emitting apparatus is turned off, extracting, from the first image frame, information specifying a face portion of the subject person, and extract, from the second image frame, information specifying a face portion of the subject person, extracting a portion that includes a bright point formed by reflection in an iris region of an eye of the subject person, from the first image frame, extracts a portion corresponding to the portion that includes the bright point, from the second image frame, and calculates a feature that is independent of the position of the bright point, and determining authenticity of subject person based on the feature.

15 Claims, 10 Drawing Sheets

(51) Int. Cl.
*G06V 10/141* (2022.01)
*G06V 40/70* (2022.01)
*G06V 40/18* (2022.01)
*G06V 10/80* (2022.01)
*G06V 10/50* (2022.01)

(52) U.S. Cl.
CPC .......... *G06V 10/806* (2022.01); *G06V 40/168* (2022.01); *G06V 40/193* (2022.01); *G06V 40/40* (2022.01); *G06V 40/70* (2022.01)

(56) References Cited

U.S. PATENT DOCUMENTS

| | | | |
|---|---|---|---|
| 2016/0117544 | A1 | 4/2016 | Hoyos et al. |
| 2016/0379050 | A1 | 12/2016 | Tian |
| 2017/0048244 | A1* | 2/2017 | Loughlin-McHugh ............... G06V 40/171 |
| 2017/0344793 | A1 | 11/2017 | Xue et al. |

FOREIGN PATENT DOCUMENTS

| | | | |
|---|---|---|---|
| JP | 2007-280367 | A | 10/2007 |
| JP | 4609253 | B2 | 1/2011 |
| JP | 2017-016192 | A | 1/2017 |

OTHER PUBLICATIONS

P. Viola and M. Jones. "Rapid Object Detection Using a Boosted Cascade of Simple Features," Proceedings of the 2001 IEEE Computer Society Conference on Computer Vision and Pattern Recognition (CVPR), vol. 1, 2001, pp. 511-518 USA.

Y. Zhang, N.Sun, Y.Gao, and M.Cao, (2008), "A new eye location method based on Ring Gabor Filter". In Automation and Logistics, 2008. ICAL2008. IEEE International Conference On, (IEEE), pp. 301-305. USA.

V. Vapnik and A. Lerner. Pattern recognition using generalized portrait method. Automation and Remote Control, 24, pp. 709-715, 1963, Russia.

English translation of Written opinion for PCT Application No. PCT/JP2018/006561, dated May 22, 2018.

Extended European Search Report for EP Application No. 18907036.0 dated on Jan. 28, 2021.

Kim Wonjun et al.: "Face Liveness Defection From a Single Image via Diffusion Speed Model", IEEE Transactions On Image Processing, IEE Service Center, Piscataway, NJ, US, vol. 24, No. 8, Aug. 1, 2015 (Aug. 1, 2015), pp. 2456-2465, XP011579882, ISSN: 1057-7149, DOI: 10.1109/TIP.2015.2422574 [retrieved on Apr. 29, 2015].

Chan Patrick P K et al: "Face Liveness Detection Using a Flash Against 2D Spoofing Attack", IEEE Transactions On Information Forensics and Security, IEEE, Piscataway, NJ, US, vol. 13, No. 2, Oct. 2, 2017 (Oct. 2, 2017), pp. 521-534, XP011673373, ISSN: 1556-6013, DOI: 10.1109/TIFS.2017.2758748 [retrieved on Nov. 28, 2017].

Japanese Office Action for JP Application No. 2020-501932 dated Sep. 14, 2021 with English Translation.

\* cited by examiner

IRIS REGION    FACE REGION

SPOOFING DETECTION APPARATUS, SPOOFING DETECTION METHOD, AND COMPUTER-READABLE RECORDING MEDIUM

CROSS REFERENCE TO RELATED APPLICATIONS

The present application is a continuation application of U.S. patent application Ser. No. 16/964,877 filed on Jul. 24, 2020, which is a National Stage Entry of PCT/JP2018/006561 filed on Feb. 22, 2018, the contents of all of which are incorporated herein by reference, in their entirety.

TECHNICAL FIELD

The present invention relates to a spoofing detection apparatus and a spoofing detection method for performing spoofing detection during face authentication, and also to a computer-readable recording medium, in which a program for realizing the apparatus and method is recorded.

BACKGROUND ART

Log-in systems that use a biometric authentication technique such as face authentication have the advantage of being unburdened by storing and managing a password, unlike log-in systems that use a password.

However, in a log-in system that uses a biometric authentication technique, even if an authorized person properly uses the system, there is the possibility that an authentication error will occur, unlike log-in systems that use a password. Furthermore, in a log-in system that uses a biometric authentication technique, there is the possibility that a third party will be recognized as an authorized person by mistake, and there is the possibility that, when a malicious third party attempts authentication using an image or a moving image of the authorized person, the image will be authenticated.

Therefore, in log-in systems that use a biometric authentication technique, from the viewpoint of security, such impersonated (spoofing) log-in by a third party that is not an authorized person has been a serious problem, and there has been increasing demand for detection techniques for preventing spoofing.

Particularly, if face authentication is used in login for an application program on a mobile terminal, it is generally more difficult to take measures against spoofing since types of hardware that are mounted in a mobile terminal are limited. Examples of a technique that is used in a spoofing detection system for face authentication include a technique that uses a special sensor such as an infrared camera, a technique for performing shooting in different directions using a plurality of cameras, and a technique for measuring the depth of a face using focus switching.

However, currently, mobile terminals are not usually equipped with hardware required for using these techniques. Examples of types of hardware mounted in a large number of mobile terminals, from among types of hardware that can be used for spoofing detection during face authentication, include an sub-camera directed to the user side and a light-emitting apparatus (flash) provided in association with the sub-camera. Therefore, techniques for performing spoofing detection using these have been proposed (for example, see Patent Document 1).

Specifically, Patent Document 1 discloses a spoofing detection apparatus that uses the fact that, in a case of a real human's face, light of the flash of a camera is specularly reflected in the iris region of an eye, and, as a result, appears as a bright point in an image, but the same phenomenon does not occur in a face in a photograph or an image on a display.

The spoofing detection apparatus disclosed in Patent Document 1 first compares an image shot when the flash was on with an image shot when the flash was off, and extracts a bright point portion in the former image. Next, the spoofing detection apparatus performs spoofing detection by obtaining a feature of the extracted portion, and comparing the obtained feature with a feature obtained from a reference image shot in advance.

LIST OF PRIOR ART DOCUMENTS

Patent Document

Patent Document 1: Japanese Patent No. 4609253

SUMMARY OF INVENTION

Problems to be Solved by the Invention

Incidentally, a bright point formed by specular reflection in an iris region of an eye is position-dependent, and the bright point changes depending on the shooting conditions of an image. In other words, in general, a position at which a bright point appears changes depending on conditions such as the positions of a light-emitting apparatus, an eyeball, and a camera in a space. As a result, the feature of the bright point portion also changes depending on the positional relation between the mobile terminal and the face during shooting, and the accuracy of spoofing detection decreases.

Therefore, the spoofing detection apparatus disclosed in Patent Document 1 estimates a position on an eyeball at which specular reflection of light from a flash will occur, and corrects the feature of a bright point portion using the estimation result, in order to dissolve the dependence on the position of the bright point.

Specifically, the spoofing detection apparatus first specifies an iris portion of an eye, and estimates a gaze direction of the eye based on the ellipsoidal shape of the specified iris portion. Next, the spoofing detection apparatus estimates a position at which a bright point will occur due to a flash, based on positional information of the camera obtained in advance and the estimated gaze direction, and corrects the feature of the bright point portion based on the estimation result.

However, in actuality, it is difficult to correct a feature when the position of a bright point has shifted, to be the same as a feature when the position of the bright point has not shifted, due to the properties of a feature. Therefore, in the spoofing detection apparatus disclosed in Patent Document 1, when the feature of a bright point portion changes due to the positional relation between the mobile terminal and the face during shooting, it is difficult to suppress a decrease in the accuracy of spoofing detection.

An example object of the invention is to provide a spoofing detection apparatus, a spoofing detection method, and a computer-readable recording medium that dissolve the above issue, and enable execution of spoofing detection without being affected by dependence on the position of a reflection bright point during face authentication.

Means for Solving the Problems

In order to achieve the above-described example object, a spoofing detection apparatus according to an example aspect of the invention includes:
- a memory storing a program; and
- a processor configured to run the program to execute:
- obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
- extracting information specifying a face portion of the subject person as first face information, from the first image frame, and extract information specifying a face portion of the subject person as second face information, from the second image frame;
- extracting a portion that includes a bright point formed by reflection in an iris region of an eye of the subject person, from the first image frame, based on the first face information, also extract a portion corresponding to the portion that includes the bright point, from the second image frame, based on the second face information, and calculate, based on the two extracted portions, a feature that is independent of a position of the bright point; and
- determining authenticity of the subject person captured by the image capture apparatus, based on the feature.

In addition, in order to achieve the above-described example object, a spoofing detection method according to an example aspect of the invention includes:
- obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
- extracting information specifying a face portion of the subject person as first face information, from the first image frame, and extracting information specifying a face portion of the subject person as second face information, from the second image frame;
- extracting a portion that includes a bright point formed by reflection in an iris region of an eye of the subject person, from the first image frame, based on the first face information, also extracting a portion corresponding to the portion that includes the bright point, from the second image frame, based on the second face information, and calculating, based on the two extracted portions, a feature that is independent of a position of the bright point; and
- determining authenticity of the subject person captured by the image capture apparatus, based on the feature.

Furthermore, in order to achieve the above-described example object, a non-transitory computer-readable recording medium according to an example aspect of the invention that includes a program recorded thereon, the program including instructions that cause a computer to carry out:
- obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
- extracting information specifying a face portion of the subject person as first face information, from the first image frame, and extracting information specifying a face portion of the subject person as second face information, from the second image frame;
- extracting a portion that includes a bright point formed by reflection in an iris region of an eye of the subject person, from the first image frame, based on the first face information, also extracting a portion corresponding to the portion that includes the bright point, from the second image frame, based on the second face information, and calculating, based on the two extracted portions, a feature that is independent of a position of the bright point; and
- determining authenticity of the subject person captured by the image capture apparatus, based on the feature.

Advantageous Effects of the Invention

As described above, according to the invention, during face authentication, spoofing detection can be executed without being affected by dependence on the position of a reflection bright point.

MODE FOR CARRYING OUT THE INVENTION

Summary of Invention

First, before describing example embodiments of the invention, summary of the invention will be described. As described above, the position of a bright point formed by reflection in an iris region of an eye changes depending on an angle at which light from a flash is incident to the iris region and orientation of the face of the subject person. Therefore, in Patent Document 1 described in BACKGROUND ART, the position of a bright point is estimated, and spoofing detection is performed based on the estimated position of the bright point. In contrast, in the invention, as will be described later, a feature for which the positional dependence is dissolved is used.

Figure 1:
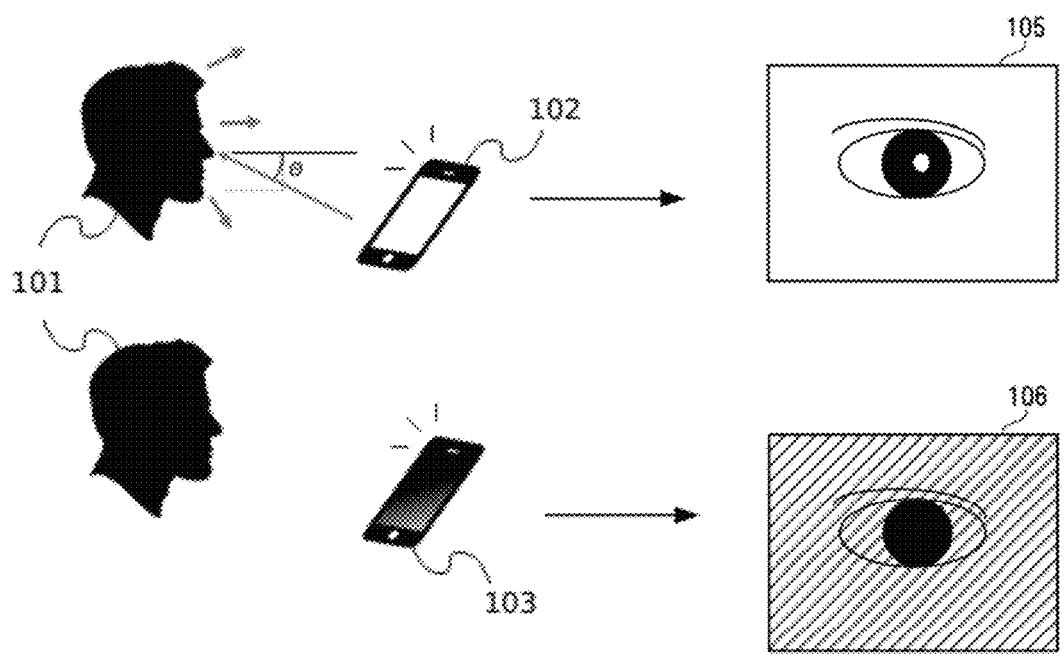
FIG. 1 is an explanatory diagram showing an example of a technique for extracting a bright point formed by light reflection in the iris region of an eye according to the invention.
Figure 2:
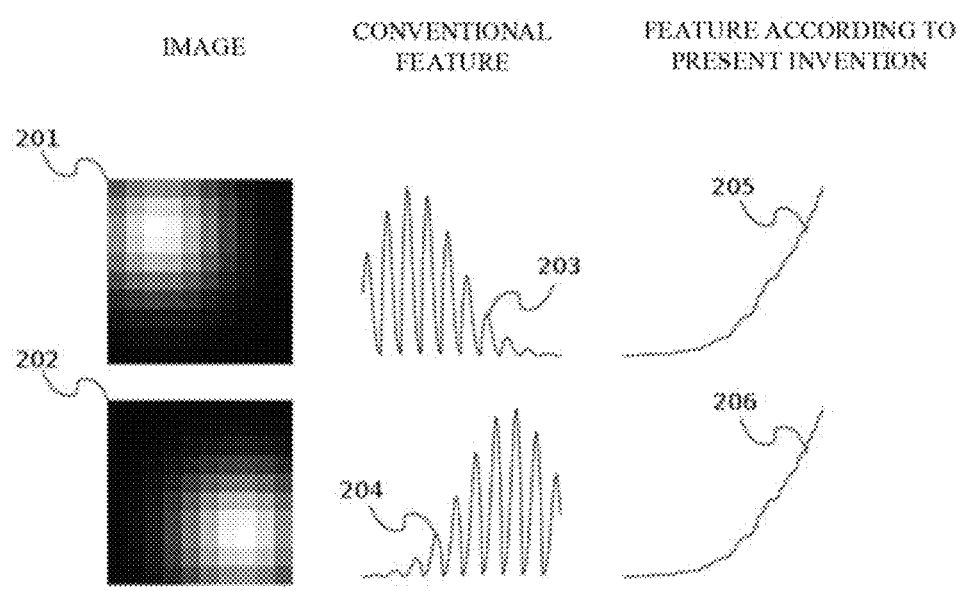
FIG. 2 is an explanatory diagram showing a feature calculated according to the invention and a feature calculated according to a conventional technique, in comparison.

Here, a method for calculating a feature for which the positional dependence is dissolved, based on an image shot when a flash was on and an image shot when the flash was off, according to the invention will be described in comparison to a conventional method for calculating a feature, with reference to FIGS. 1 and 2. FIG. 1 is an explanatory diagram showing an example of a technique for extracting a bright point formed by reflection on an iris region of an eye, according to the invention. FIG. 2 is an explanatory diagram showing a feature calculated according to the invention and a feature calculated according to a conventional technique, in comparison.

First, as shown on the upper side of FIG. 1, a user 101 shoots their own face at least once using a terminal apparatus 102 equipped with a camera when the flash is on, and also shoots their own face at least once using a terminal apparatus 103 equipped with a camera when the flash is off. In the invention, a bright point portion is extracted from images obtained through such shooting, and a feature of the extracted bright point portion is calculated.

FIG. 1 shows an image 105 that represents an image when the flash is on, and an image 106 that represents an image when the flash is off. According to the invention, a bright point portion is extracted by comparing both the images, and a feature is calculated for the extracted portion. In addition, according to the invention, if a bright point portion can be extracted, it is determined that the face that appears in the images 105 and 106 is a real human face. On the other hand, if no bright point portion can be extracted, it is determined that the face that appears in the images 105 and 106 is a fake face.

However, as described above, the position of a bright point formed by flash reflection changes depending on shooting conditions. Therefore, as shown in images 201 and 202 on the left side of FIG. 2, there is the possibility that, even in the same real face, the position of a bright point will deviate. If the position of a bright point deviates, when images are converted into a feature of a one-dimensional vector, a different feature will be calculated.

A feature 203 shown in the center of FIG. 2 is calculated based on the image 201, and a feature 204 is calculated based on the image 202. The feature 203 and the feature 204 are calculated based on bright points that differ only in their positions, but the similarity between these amounts is low. In addition, this decrease in similarity leads to a decrease in the determination accuracy. Note that both the feature 203 and the feature 204 are features based on which a determination as a real face should be made. As described above, the spoofing detection apparatus disclosed in Patent Document 1 copes with this problem by estimating the position of a bright point, and correcting a feature based on the estimation result.

In contrast, according to the invention, in place of estimation of the position of a bright point that involves a certain degree of uncertainty, a feature 205 and a feature 206 shown on the right side of FIG. 2 are calculated. The feature 205 and the feature 206 are features that are independent of the position of a bright point. Therefore, according to the invention, it is possible to more easily and more accurately perform spoofing detection that is robust against an environment change.

Example embodiments of the invention will be described below. Note that the following description and drawings are omitted and simplified as appropriate for clarification. In addition, in the drawings, the same reference signs are assigned to the same constituent elements, and redundant description is omitted as necessary. In addition, specific numerical values and the like mentioned in the example embodiments are merely exemplary for ease of understanding of the invention, and there is no limitation thereto.

First Example Embodiment

A spoofing detection apparatus, a spoofing detection method, and a program according to a first example embodiment of the invention will be described below with reference to FIGS. 3 to 5 below.

[Apparatus Configuration]

First, the configuration of the spoofing detection apparatus according to the first example embodiment will be described with reference to FIG. 3. FIG. 3 is a block diagram showing the configuration of the spoofing detection apparatus according to the first example embodiment of the invention.

Figure 3:
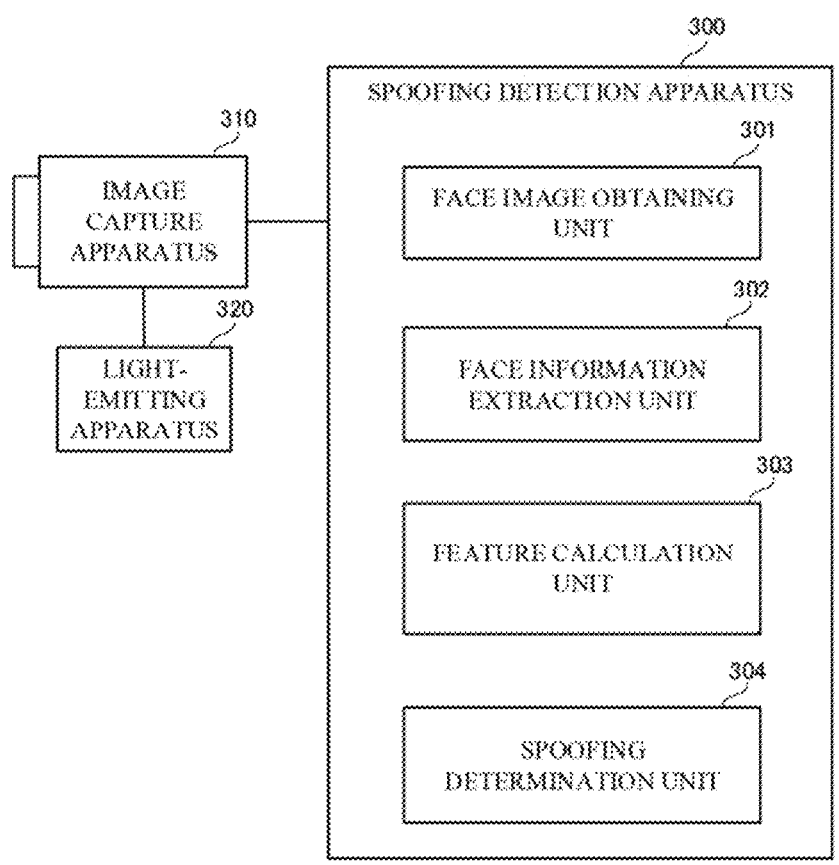
FIG. 3 is a block diagram showing the configuration of a spoofing detection apparatus according to a first example embodiment of the invention.

A spoofing detection apparatus 300 according to the first example embodiment shown in FIG. 3 is an apparatus for performing spoofing detection during face authentication. As shown in FIG. 1, the spoofing detection apparatus 300 includes a face image obtaining unit 301, a face information extraction unit 302, a feature calculation unit 303, and a spoofing determination unit 304.

The face image obtaining unit 301 obtains, from an image capture apparatus 310, a first image frame that includes the face of a subject person when light was emitted by a light-emitting apparatus 320 accompanying the image capture apparatus 310 and a second image frame that includes the face of the subject person when the light-emitting apparatus 320 was turned off.

The face information extraction unit 302 extracts, from the first image frame, information specifying a face portion of the subject person as first face information. The face information extraction unit 302 also extracts, from the second image frame, information specifying a face portion of the subject person as second face information.

The feature calculation unit 303 extracts, from the first image frame, a portion that includes a bright point formed by reflection in an iris region of an eye of the subject person, based on the first face information. The feature calculation unit 303 also extracts, from the second image frame, a portion corresponding to the above portion that includes the bright point, based on the second face information. The feature calculation unit 303 then calculates, based on the two extracted portions, a feature that is independent of the position of the bright point.

The spoofing determination unit 304 determines authenticity of the subject person captured by the image capture apparatus 310, based on the feature calculated by the feature calculation unit 303. Specifically, the spoofing determination unit 304 determines whether or not the captured subject person is a real human.

As described above, in the first example embodiment, the spoofing detection apparatus 300 can calculate a feature that is independent of the position of a bright point, unlike the conventional spoofing detection apparatus described in BACKGROUND ART (see FIG. 2 above). Therefore, according to the first example embodiment, during face authentication, it is possible to perform spoofing detection without being affected by dependence on the position of a reflection bright point.

Subsequently, the configuration of the spoofing detection apparatus 300 according to the first example embodiment will be described in more detail. First, as shown in FIG. 1, according to the first example embodiment, the spoofing detection apparatus 300 is connected to the image capture apparatus 310 that includes the light-emitting apparatus 320. Examples of the image capture apparatus 310 include a digital camera and a digital video camera.

As described above, the face image obtaining unit 301 obtains a first image frame shot when the light-emitting apparatus was emitting light and a second image frame shot when the light-emitting apparatus was turned off. In addition, the first image frame and the second image frame that are obtained at this time may be image frames of still images, or may also be image frames of moving images.

According to the first example embodiment, the face information extraction unit 302 first detects the region of a face portion of a subject person (hereinafter, referred to as "face region"), from each of the first image frame and the second image frame. Specifically, the face information extraction unit 302 detects a face region, for example, using a Haar-like feature. A method for detecting a face region using a Haar-like feature is disclosed in Reference Document 1 below, for example.

Reference Document 1

P. Viola and M. Jones, "Rapid Object Detection Using a Boosted Cascade of Simple Features," Proceedings of the 2001 IEEE Computer Society Conference on Computer Vision and Pattern Recognition (CVPR), Vol. 1, 2001, pp. 511-518.

Next, the face information extraction unit 302 extracts first face information from the face region extracted from the first image frame, and extracts second face information from the face region extracted from the second image frame. Specifically, the face information extraction unit 302 estimates the regions of the parts of the face based on the face region, and defines information specifying the positions of the estimated regions of the parts as face information. In addition, the face information includes information specifying the position of an estimated iris region.

In addition, as examples of a method for estimating an iris region include a method for first detecting eye regions, calculating the distance between the eyes, next, using this distance between the eyes to set a square whose center is the same as the center of each of the eyes, and each side of which is one sixth of the distance between the eyes, and defining the region of this square as an iris region. In addition, examples of a method for detecting an eye region include a method that uses a ring Gabor filter, which is disclosed in Reference Document 2 below.

Reference Document 2

Zhang, Y., Sun, N., Gao, Y., and Cao, M. (2008). A new eye location method based on Ring Gabor Filter. In Automation and Logistics, 2008. ICAL2008. IEEE International Conference On, (IEEE), pp. 301-305.

In the first example embodiment, the feature calculation unit 303 extracts an iris region in the first image frame (hereinafter, referred to as a "first iris region"), using the first face information, and also extracts an iris region in the second image frame (hereinafter, referred to as a "second iris region"), using the second face information.

The feature calculation unit 303 then obtains a luminance value $L_{in}$ of each pixel of the first iris region and a luminance value $L_{out}$ of each pixel of the second iris region, and calculates the difference between these values (Lin–Lout) as a temporary feature, for each pixel. In addition, the feature calculation unit 303 can also perform standardization, scaling, or the like on the temporary feature ($L_{in}$–$L_{out}$), and transform this into a manageable form.

Subsequently, the feature calculation unit 303 executes conversion processing for dissolving the positional dependence, on the temporary feature in order to obtain a feature that is independent of the position of the bright point. For example, the feature calculation unit 303 performs the conversion by converting the temporary feature (difference ($L_{in}$–$L_{out}$) for each pixel) calculated based on the iris regions, which are two-dimensional planes, into a one-dimensional vector, and sorting the values of the respective pixels in ascending order or descending order. The feature that underwent conversion in this manner is a feature for which the positional dependence is dissolved.

Figure 4:
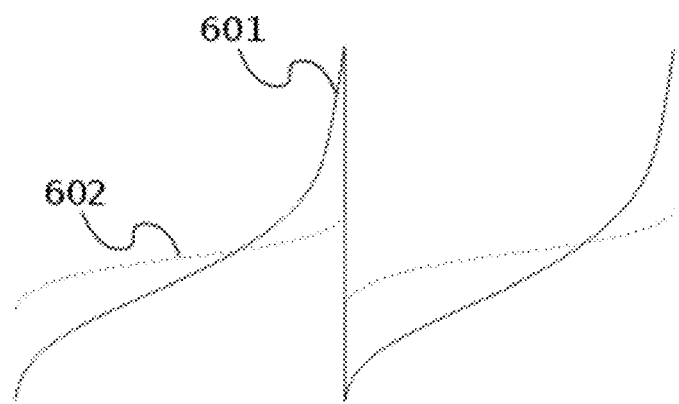
FIG. 4 is a diagram showing an example of features obtained according to the first example embodiment of the invention.

FIG. 4 is a diagram showing an example of a feature obtained according to the first example embodiment of the invention. In the example in FIG. 4, a feature 601 is a feature obtained when the subject person is a real human. A feature 602 is a feature obtained from a face in a photograph or an image.

According to the first example embodiment, the spoofing determination unit 304 determines the authenticity of a subject person, that is to say whether or not the subject person is a real human, by applying a feature calculated by the feature calculation unit 303 to a classifier created in advance.

Specifically, examples of the classifier include an SVM binary classifier constructed using an SVM (Support Vector Machine). In addition, this classifier is constructed by preparing a feature calculated in advance based on an image of a real human face and a feature calculated based on an image of a fake human face, and performing learning using these features. Note that a method for constructing a classifier using a Support Vector Machine is disclosed in Reference Document 3 below.

Reference Document 3

V. Vapnik and A. Lerner. Pattern recognition using generalized portrait method. Automation and Remote Control, 24, 1963.

[Apparatus Operations]

Next, operations of the spoofing detection apparatus 300 according to the first example embodiment of the invention will be described with reference to FIG. 5. FIG. 5 is a flowchart showing operations of the spoofing detection apparatus according to the first example embodiment of the invention. In the following description, FIGS. 3 and 4 will be referred to as appropriate. In addition, according to the first example embodiment, the spoofing detection method is carried out as a result of causing the spoofing detection apparatus 300 to operate. Thus, a description of the spoofing detection method according to the first example embodiment is replaced with the following description of operations of the spoofing detection apparatus 300.

Figure 5:
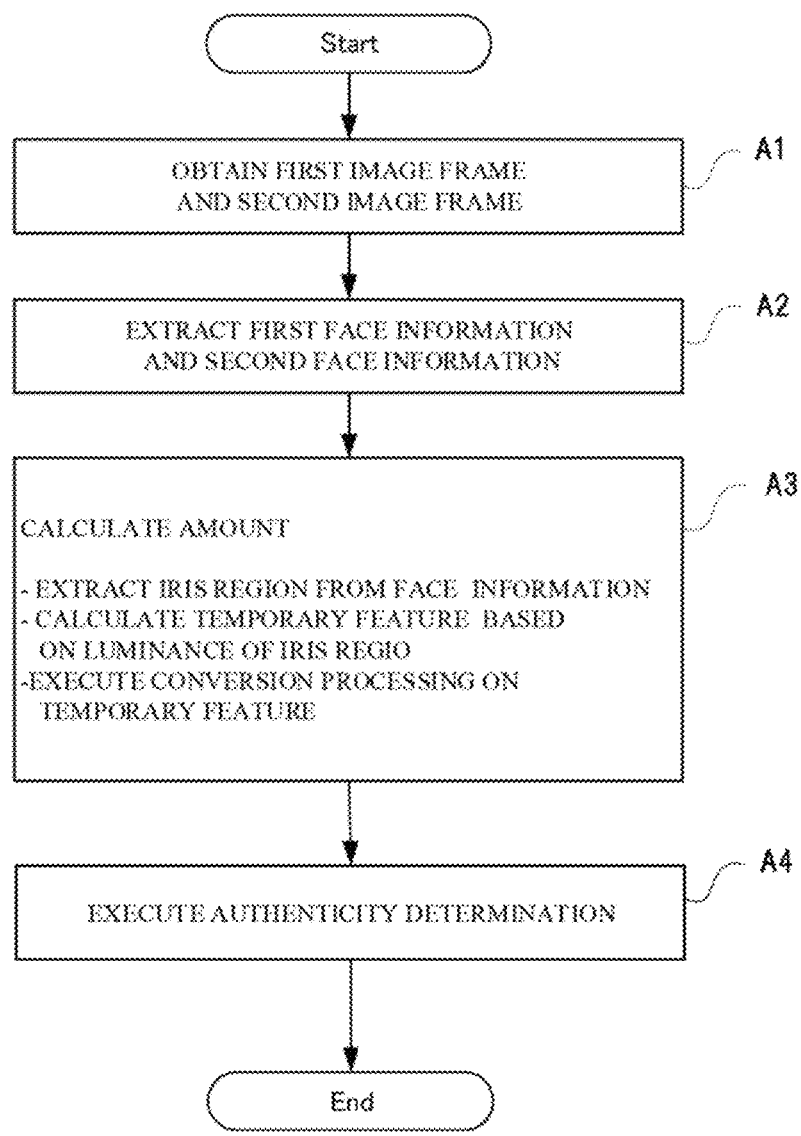
FIG. 5 is a flowchart showing operations of the spoofing detection apparatus according to the first example embodiment of the invention.

As shown in FIG. 5, first, the face image obtaining unit 301 obtains, from the image capture apparatus 310, a first image frame that includes the face of a subject person when light was emitted from the light-emitting apparatus 320 associated with the image capture apparatus 310 and a second image frame that includes the face of the subject person when the light-emitting apparatus 320 was turned off (step A1).

Next, the face information extraction unit 302 extracts, from the first image frame, information specifying a face portion of the subject person as first face information, and also extracts, from the second image frame, information specifying a face portion of the subject person as second face information (step A2).

Next, the feature calculation unit 303 extracts a portion that includes a bright point, from the first image frame based on the first face information, and extract a portion corresponding to the portion that includes the bright point, from the second image frame based on the second face information. The feature calculation unit 303 then calculates a feature that is independent of the position of the bright point, based on the two extracted portions (step A3).

Specifically, in step A3, the feature calculation unit 303 first extracts a first iris region in the first image frame using the first face information, and also extracts a second iris region in the second image frame using the second face information. Next, the feature calculation unit 303 calculates a difference between the luminance value $L_{in}$ of each pixel of the first iris region and the luminance value $L_{out}$ of each pixel of the second iris region ($L_{in}-L_{out}$), as a temporary feature, for each pixel. The feature calculation unit 303 then executes conversion processing for dissolving the positional dependence, on the temporary feature, and calculates a feature for which the positional dependence is dissolved.

The spoofing determination unit 304 then determines the authenticity of the subject person captured by the image capture apparatus 310, based on the feature calculated by the feature calculation unit 303 in step A3 (step A4). Specifically, the spoofing determination unit 304 determine whether or not the captured subject person is a real human.

After executing step A4, the spoofing detection apparatus notifies the determination result to an apparatus that uses a detection result. If the detection result indicates a real human, the apparatus that has received the notification continues authentication processing, and, if the detection result does not indicate a real human, the apparatus stops authentication processing.

Effect of First Example Embodiment

As described above, according to the first example embodiment, the spoofing detection apparatus 300 calculates a feature that is independent of the position of a bright point formed in an iris region of an eye of a subject person, and can perform determination of whether or not spoofing has occurred, based on this feature. Therefore, according to the first example embodiment, spoofing detection can be performed without being affected by the positional relation between the image capture apparatus 310 and a face, in other words, without being affected by dependence on the position of a reflection bright point.

[Program]

The program according to the first example embodiment may be a program for causing a computer to execute steps A1 to A4 shown in FIG. 5. The spoofing detection apparatus 300 and the spoofing detection method according to the first example embodiment can be realized as a result of installing this program to a computer, and executing this program. In this case, the processor of the computer functions as the face image obtaining unit 301, the face information extraction unit 302, the feature calculation unit 303, and the spoofing determination unit 304, and performs processing.

In addition, the program according to the first example embodiment may also be executed by a computer system constituted by a plurality of computers. In this case, for example, each of the computers may also function as one of the face image obtaining unit 301, the face information extraction unit 302, the feature calculation unit 303, and the spoofing determination unit 304.

Second Example Embodiment

Next, a spoofing detection apparatus, a spoofing detection method, and a program according to a second example embodiment of the invention will be described with reference to FIGS. 6 and 7.

[Apparatus Configuration]

First, the configuration of the spoofing detection apparatus according to the second example embodiment will be described with reference to FIG. 6. FIG. 6 is a block diagram showing the configuration of the spoofing detection apparatus according to the second example embodiment of the invention.

Figure 6:
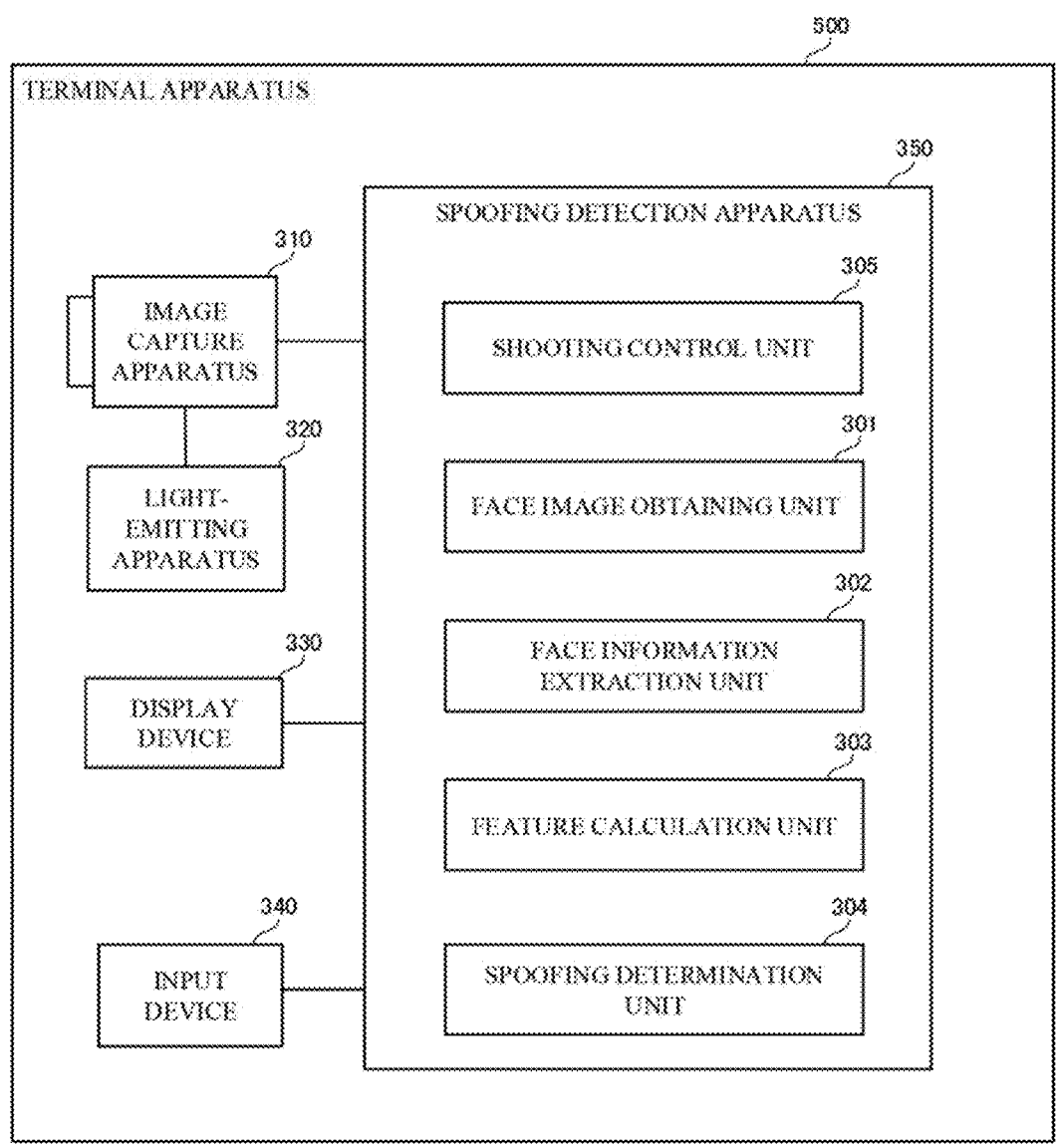
FIG. 6 is a block diagram showing the configuration of a spoofing detection apparatus according to a second example embodiment of the invention.

As shown in FIG. 6, a spoofing detection apparatus 350 according to the second example embodiment is constituted by a mobile terminal apparatus 500. Specifically, the spoofing detection apparatus 350 is constituted by a program that operates on the operating system of the terminal apparatus 500. In addition, the terminal apparatus 500 includes the image capture apparatus 310, the light-emitting apparatus 320, a display device 330, and an input device 340.

As shown in FIG. 6, also according to the second example embodiment, the spoofing detection apparatus 350 includes the face image obtaining unit 301, the face information extraction unit 302, the feature calculation unit 303, and the spoofing determination unit 304, similarly to the spoofing detection apparatus 300 according to the first example embodiment shown in FIG. 3. Functions of these are the same as those described in the first example embodiment.

Note that, according to the second example embodiment, the spoofing detection apparatus 350 further includes a shooting control unit 305, unlike the first example embodiment. The shooting control unit 305 controls shooting that is performed by the image capture apparatus 310 and on/off of the light-emitting apparatus 320, and sets a light-emitting period of the light-emitting apparatus 320 and a shooting timing of the image capture apparatus 310.

Specifically, the shooting control unit 305 instructs the light-emitting apparatus 320 to emit light, and then instruct the image capture apparatus 310 to perform shooting for 150 milliseconds. Thereafter, the shooting control unit 305 instructs the light-emitting apparatus 320 to turn off, and then instructs the image capture apparatus 310 to perform shooting for 150 milliseconds.

[Apparatus Operations]

Next, operations of the spoofing detection apparatus 350 according to the second example embodiment of the invention will be described with reference to FIG. 7. FIG. 7 is a flowchart showing operations of the spoofing detection apparatus according to the second example embodiment of the invention. In the following description, FIG. 6 will be referred to as appropriate. In addition, according to the second example embodiment, the spoofing detection method is carried out as a result of causing the spoofing detection apparatus 350 to operate. Thus, a description of the spoofing detection method according to the second example embodiment is replaced with the following description of operations of the spoofing detection apparatus 350.

Figure 7:
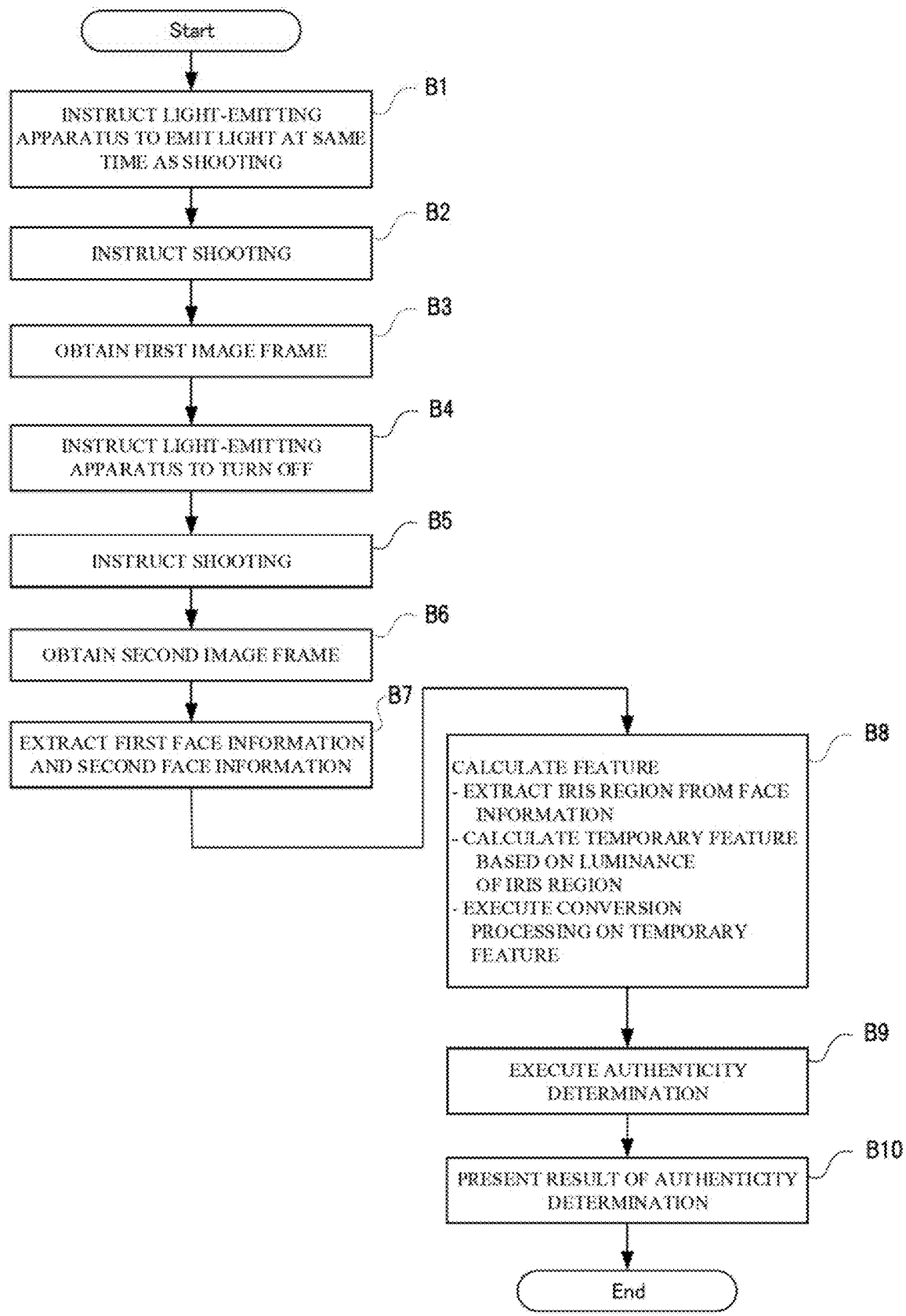
FIG. 7 is a flowchart showing operations of the spoofing detection apparatus according to the second example embodiment of the invention.

Note that, in the example in FIG. 7, an image of the face of a subject person when light is emitted and an image when light is not emitted are shot. In addition, a light-emitting period of the light-emitting apparatus 320 is 300 milliseconds, and one image is shot in 150 milliseconds after light emission is started, and another image is shot in 150 milliseconds after the light was turned off.

As shown in FIG. 7, first, when the terminal apparatus 500 is instructed to perform authentication, the shooting control unit 305 instructs the light-emitting apparatus 320 to emit light at the same time as shooting (step B1), and also instructs the image capture apparatus 310 to perform shooting (step B2).

When step B2 is executed, shooting is performed by the image capture apparatus 310, and image data is output, and thus the face image obtaining unit 301 obtains the output image data as a first image frame (step B3).

Next, after step B3 is executed, the shooting control unit 305 instructs the light-emitting apparatus 320 to turn off (step B4), and further instructs the image capture apparatus 310 to perform shooting (step B5).

When step B5 is executed, shooting is performed by the image capture apparatus 310, and image data is output, and thus the face image obtaining unit 301 obtains the output image data as a second image frame (step B6).

Next, the face information extraction unit 302 extracts information specifying a face portion of the subject person as first face information, from the first image frame obtained in step B3, and also extracts information specifying a face portion of the subject person as second face information, from the second image frame obtained in step B6 (step B7).

Next, the feature calculation unit 303 extracts a portion that includes a bright point, from the first image frame based on the first face information, and extracts a portion corresponding to the portion that includes the bright point, from the second image frame based on the second face information. The feature calculation unit 303 then calculates, based on the two extracted portions, a feature that is independent of the position of the bright point (step B8).

Next, the spoofing determination unit 304 determines the authenticity of the subject person captured by the image capture apparatus 310, based on the feature calculated by the feature calculation unit 303 in step B8 (step B9). Specifically, the spoofing determination unit 304 determine whether or not the captured subject person is a real human. Note that steps B7 to B9 are similar to the corresponding steps A2 to A4 shown in FIG. 5.

Thereafter, the spoofing determination unit 304 presents the result of the determination performed in step B9 (detection result), on a screen using the display device 330 of the terminal apparatus 500 (step B10). Accordingly, the user of the terminal apparatus 500 can confirm the detection result. In addition, if the detection result indicates a real human, the terminal apparatus 500 continues authentication processing, and if the detection result does not indicate a real human, the terminal apparatus 500 stops authentication processing.

Effect of Second Example Embodiment

As described above, also in the second example embodiment, similarly to the first example embodiment, the spoofing detection apparatus 350 can calculate a feature that is independent of the position of a bright point formed in the iris region of an eyes of a subject person, and determine whether or not spoofing has occurred, based on this feature.

Therefore, according to the second example embodiment, spoofing detection can be performed without being affected by the positional relation between the image capture apparatus 310 and the face, in other words, without being affected by dependence on the position of a reflection bright point.

[Program]

The program according to the second example embodiment may be a program for causing a computer to execute steps B1 to B10 shown in FIG. 7. The spoofing detection apparatus 350 and the spoofing detection method according to the second example embodiment can be realized as a result of installing this program to a computer, and executing this program. In this case, the processor of the computer functions as the face image obtaining unit 301, the face information extraction unit 302, the feature calculation unit 303, the spoofing determination unit 304, and the shooting control unit 305, and performs processing.

In addition, the program according to the second example embodiment may also be executed by a computer system constituted by a plurality of computers. In this case, for example, each of the computers may also function as one of the face image obtaining unit 301, the face information extraction unit 302, the feature calculation unit 303, the spoofing determination unit 304, and the shooting control unit 305.

Third Example Embodiment

Next, a spoofing detection apparatus, a spoofing detection method, and a program according to a third example embodiment of the invention will be described with reference to FIGS. 8 and 9.

[Apparatus Configuration]

First, the configuration of the spoofing detection apparatus according to the third example embodiment will be described. In this third example embodiment, the configuration of the spoofing detection apparatus is similar to the configuration of the spoofing detection apparatus 350 according to the second example embodiment shown in FIG. 6. Therefore, in the third example embodiment, FIG. 6 will be referred to.

However, the spoofing detection apparatus according to the third example embodiment is different from the spoofing detection apparatus 350 according to the second example embodiment, in the functions of the feature calculation unit 303 and the spoofing determination unit 304. The differences will be mainly described below.

According to the third example embodiment, more accurate spoofing detection is achieved. Therefore, the feature calculation unit 303 calculates a second feature, in addition to a feature independent of the position of a bright point (hereinafter, referred to as a "first feature") described in the first and second example embodiments, and integrates these features.

According to the third example embodiment, the second feature is a feature that is obtained based on diffuse reflection on the face of a subject person, and that reflects the three-dimensional shape of the face. Specular reflection that occurs in an iris region does not occur in the face region of a human, and the light of a flash is diffusely reflected due to the three-dimensional (uneven) shape of the face. Therefore, if a feature that reflects the three-dimensional shape of the face is calculated based on the pattern of this diffuse reflection, it is possible to perform determination between a real three-dimensional face and a face in a two-dimensional photograph or a face on a display screen.

Specifically, the feature calculation unit 303 specifies a face region of the subject person (hereinafter, referred to as a "first face region"), from the first image data, based on the first face information, and also specifies a face region of the subject person (hereinafter, referred to as a "second face region"), from the second image data, based on the second face information. The feature calculation unit 303 then obtains the difference between the luminance distribution of the first face region and the luminance distribution of the second face region, and calculates a second feature based on the obtained difference.

Here, a method for calculating a second feature will be described. First, Lambert's model, which is a model of diffuse reflection, is examined. In Lambert's model, an observed luminance value L is considered as deriving from a light source component I, a reflection coefficient K, and an angular component θ of a surface as follows.

$$L(\lambda) = IK(\lambda)\cos\theta \quad (1)$$

Here, since K is a function of a light wavelength λ, the observed luminance value L is also a function of the light wavelength λ. Thus, it can be said that the luminance value L is an observed value that is dependent on the light wavelength λ, in other words, the color of light. However, if a feature changes depending on the color of the surface of a face, spoofing detection cannot be accurately performed. In view of this, a second feature that is independent of the reflection coefficient K is calculated using an image when the light-emitting apparatus 320 is emitting light and an image when the light-emitting apparatus 320 is turned off. Specifically, the second feature is calculated as follows.

The luminance value $L_{in}$ of each pixel of the first image frame shot when the light-emitting apparatus 320 was emitting light and the luminance value $L_{out}$ of each pixel of the second image frame shot when the light-emitting apparatus 32 was turned off can be respectively expressed as Expressions 2 and 3 below.

$$L_{in}(\lambda, x, y) = I_c K(\lambda, x, y)\cos\theta_c + I_b K(\lambda, x, y)\cos\theta_b \quad (2)$$

$$L_{out}(\lambda, x, y) = I_b K(\lambda, x, y)\cos\theta_b \quad (3)$$

Here, similar to Expression 1 above, I is a light source component, K is a reflection coefficient that is dependent on a color, and θ is an angular component of a surface. In addition, Ic and Ib respectively indicate the intensity of light of the flash of a camera and the intensity of background light (ambient light). x and y indicate a position of a pixel in an image frame. θc and θb respectively indicate an incident angle of camera light and an incident angle of background light. Obtaining a second feature that is independent of the color of the surface of a face region, and that reflects the three-dimensional shape of the face is the same as obtaining a feature that is independent of K. In view of this, Expression 4 below is introduced as a feature for which the ratio of the luminance value $L_{in}$ to the luminance value $L_{out}$ for each pixel is used.

$$\frac{L_{in} - L_{out}}{L_{in} + L_{out}} = \frac{I_c K(\lambda, x, y)\cos\theta_c}{I_c K(\lambda, x, y)\cos\theta_c + 2I_b K(\lambda, x, y)\cos\theta_b} \quad (4)$$

$$= \frac{I_c \cos\theta_c}{I_c \cos\theta_c + 2I_b \cos\theta_b}$$

It can be said that the feature shown in Expression 4 is a feature that is independent of the reflection coefficient K, and for which the color dependence is dissolved. In addition, the feature calculation unit 303 converts the feature indicated in Expression 4 into a one-dimensional vector, and performs conversion of sorting the values of respective pixels in ascending order or descending order. Accordingly, the larger the light diffuse reflection that occurs on the surface of a face is, the larger the value of the obtained feature is, and thus the three-dimensional shape of the face is reflected on the obtained feature.

According to the third example embodiment, the spoofing determination unit 304 determines the authenticity using the integrated first feature and second feature. Specifically, according to the third example embodiment, different features are calculated based on a plurality of regions of a face using face information, and authenticity is determined based on a feature obtained by integrating these obtained features.

[Apparatus Operations]

Next, operations of the spoofing detection apparatus according to the third example embodiment of the invention will be described with reference to FIG. 8. FIG. 8 is a flowchart showing operations of the spoofing detection apparatus according to the third example embodiment of the invention. In the following description, FIG. 6 will be referred to as appropriate. In addition, according to the third example embodiment, the spoofing detection method is carried out as a result of causing the spoofing detection apparatus to operate. Thus, a description of the spoofing detection method according to the third example embodiment is replaced with the following description of operations of the spoofing detection apparatus.

Figure 8:
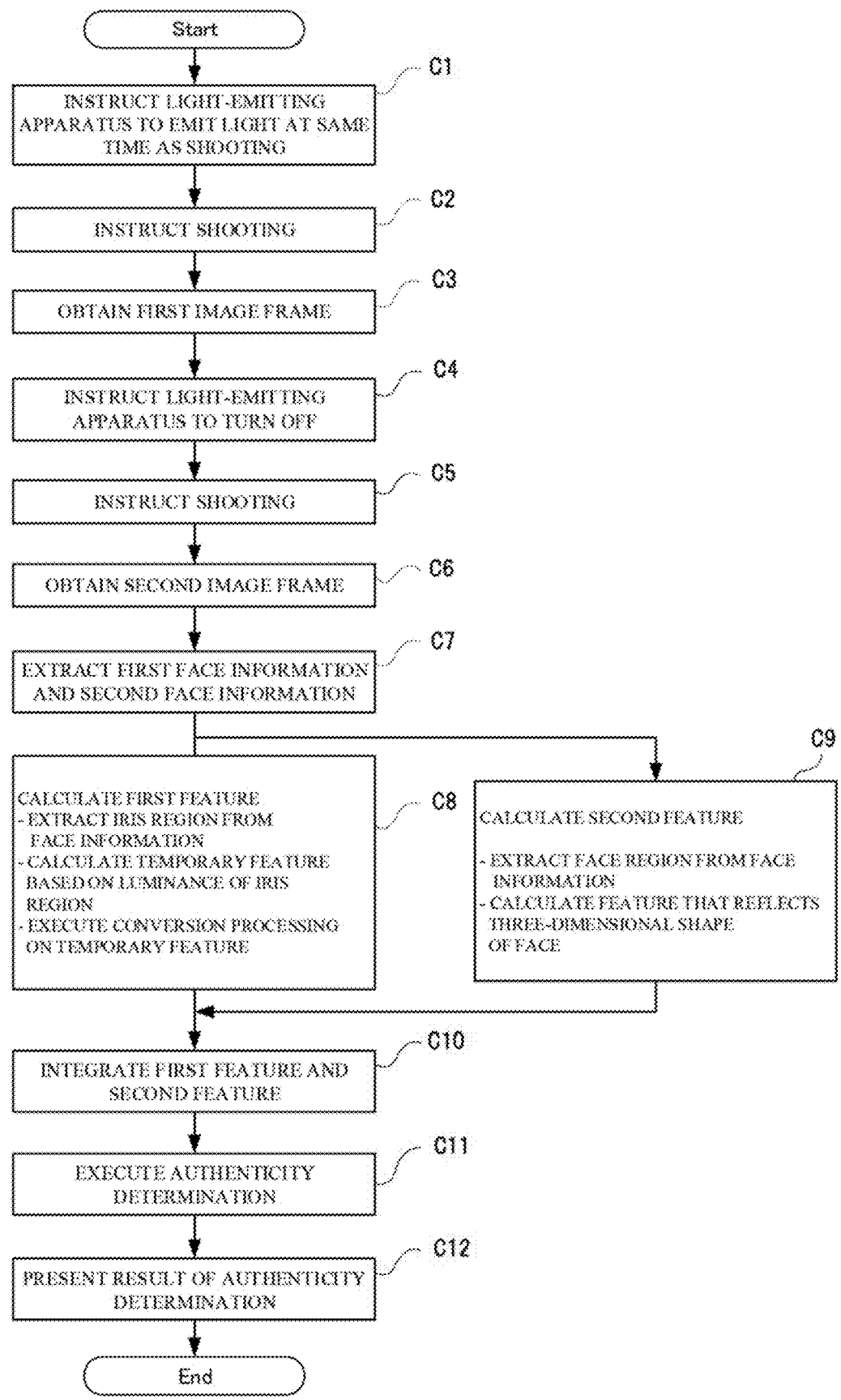
FIG. 8 is a flowchart showing operations of a spoofing detection apparatus according to a third example embodiment of the invention.

Note that, also in the example in FIG. 8, similarly to the example in FIG. 7, an image of the face of a subject person when a flash is on and an image when the flash is off are shot. In addition, the flash illumination time is 300 milliseconds, and one image is shot in 150 milliseconds after flash illumination is started, and another image is shot in 150 milliseconds after the flash is turned off.

As shown in FIG. 8, first, when the terminal apparatus 500 is instructed to perform authentication, the shooting control unit 305 instructs the light-emitting apparatus 320 to emits light at the same time as shooting (step C1), and also instructs the image capture apparatus 310 to perform shooting (step C2).

When step C2 is executed, shooting is performed by the image capture apparatus 310, and image data is output, and thus the face image obtaining unit 301 obtains the output image data as a first image frame (step C3).

Next, after step C3 is executed, the shooting control unit 305 instructs the light-emitting apparatus 320 to turn off (step C4), and also instructs the image capture apparatus 310 to perform shooting (step C5).

When step C5 is executed, shooting is performed by the image capture apparatus 310, and image data is output, and thus the face image obtaining unit 301 obtains the output image data as a second image frame (step C6).

Next, the face information extraction unit 302 extracts information specifying a face portion of the subject person as first face information, from the first image frame obtained in step C3, and extracts information specifying a face portion of the subject person as second face information, from the second image frame obtained in step C6 (step C7).

Next, the feature calculation unit 303 extracts a portion that includes a bright point, from the first image frame, based on the first face information, and extracts a portion corresponding to the portion that includes the bright point, from the second image frame, based on the second face information. The feature calculation unit 303 then calculates, based on the two extracted portions, a feature that is independent of the position of the bright point (step C8).

The above steps C1 to C8 are similar to steps B1 to B8 according to the second example embodiment shown in FIG. 7, and similar processes are performed in these steps. However, according to the third example embodiment, step C9 is executed in parallel to or before/after step C8.

In step C9, the feature calculation unit 303 calculates a second feature that reflects the three-dimensional shape of the face, based on diffuse reflection on the face of the subject person. Specifically, the feature calculation unit 303 specifies a first face region from the first image data based on the first face information, and also specifies a second face region from the second image data based on the second face information. The feature calculation unit 303 then obtains the difference between luminance distribution of the first face region and luminance distribution of the second face region, and calculates a second feature based on the obtained difference.

Figure 9:
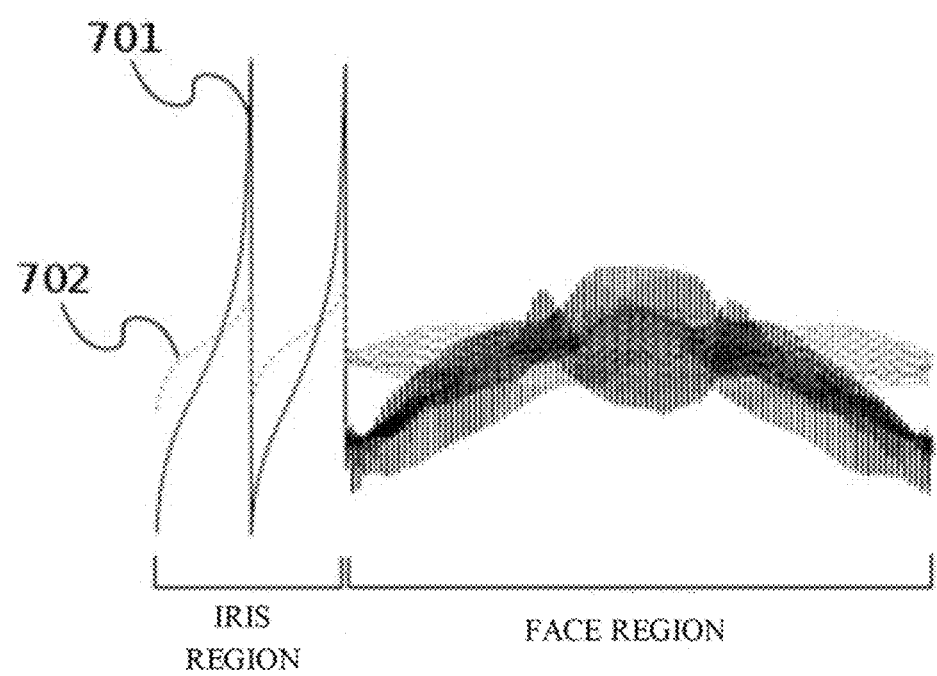
FIG. 9 is a diagram showing an example of a feature calculated based on an iris region and a feature calculated based on a face region according to the third example embodiment.

FIG. 9 is a diagram showing an example of a feature calculated based on an iris region and a feature calculated based on a face region according to the third example embodiment. As shown in FIG. 9, according to the third example embodiment, features calculated based on iris regions and features calculated based on face regions are obtained. In FIG. 9, reference numeral 701 denotes a feature vector calculated based on an iris region of a real face, and reference numeral 702 denotes a feature vector calculated based on an iris region of a fake face.

Next, the feature calculation unit 303 integrates the feature obtained in step C8 and the feature obtained in step C9 (step C10). Specifically, the features have been converted into a one-dimensional vector, and thus two features are integrated into one vector.

Next, the spoofing determination unit 304 determines the authenticity of the subject person captured by the image capture apparatus 310, based on the features integrated in step C10 (step C11). Specifically, the spoofing determination unit 304 determines whether or not the captured subject person is a real human. Step C10 is similar to step B9 shown in FIG. 7.

The spoofing determination unit 304 then presents the result of the determination (detection result) in step B9, on a screen using the display device 330 of the terminal apparatus 500 (step C12). Step C12 is similar to step B10 shown in FIG. 7.

Accordingly, also in the third example embodiment, the user of the terminal apparatus 500 can confirm the detection result. In addition, if the detection result indicates that the subject person is a real human, the terminal apparatus 500 continues authentication processing, and, if the detection result indicates that the subject person is not a real human, the terminal apparatus 500 stops authentication processing.

Effect of Third Example Embodiment

As described above, according to the third example embodiment, two regions where different forms of reflection occur, namely an iris region in which light from the light-emitting apparatus 320 is specularly reflected and a face region in which light from the light-emitting apparatus 320 is diffusely reflected are combined, and thereby a feature is calculated. Authenticity is then determined based on the feature obtained through this combination, and thus, according to the third example embodiment, more accurate spoofing detection is enabled.

[Program]

The program according to the third example embodiment may be a program for causing a computer to execute steps C1 to C12 shown in FIG. 8. The spoofing detection apparatus and the spoofing detection method according to the third example embodiment can be realized as a result of installing this program to a computer, and executing this program. In this case, the processor of the computer functions as the face image obtaining unit 301, the face information extraction unit 302, the feature calculation unit 303, the spoofing determination unit 304, and the shooting control unit 305, and performs processing.

In addition, the program according to the third example embodiment may also be executed by a computer system constituted by a plurality of computers. In this case, for example, each of the computers may also function as one of the face image obtaining unit 301, the face information extraction unit 302, the feature calculation unit 303, the spoofing determination unit 304, and the shooting control unit 305.

Modified Examples of Example Embodiments

According to the above third example embodiment, the spoofing determination unit 304 can separately execute authenticity determination that is based on the feature calculated in step C8 and authenticity determination that is based on the feature calculated in step C9. In this case, the spoofing determination unit 304 performs determination based on the two authenticity determination results in a comprehensive manner, and conclusively determines whether or not spoofing has occurred.

Specifically, the spoofing determination unit 304 calculates a score that indicates the possibility of being authentic (true/false value) every time authenticity determination is performed, and, for example, the spoofing determination unit 304 obtains the average value of two scores, and makes a determination of true (a real human) if the average value exceeds a fixed value.

In addition, according to the above second and three example embodiments, one image of a face is shot when the light-emitting apparatus 320 is emitting light and another image of the face is shot when the light-emitting apparatus 320 is turned off, as still images, and the light-emitting period is 300 milliseconds, and shooting timings are set to 150 milliseconds from when light is emitted and 150 milliseconds after light is turned off. Note that these settings are exemplary, and may be changed. The shooting control unit 305 can change the settings in accordance with a value input to the terminal apparatus 500 by the user, for example.

In addition, in the above first to third example embodiments, shooting that is performed by the image capture apparatus 310 is performed in a state where the face of a subject person is stationary. This is because the face of the subject person needs to be extracted from an image. Therefore, during shooting, it is preferable to prompt the subject person to not move their face. Therefore, for example, before giving an instruction to perform shooting, the face image obtaining unit 301 preferably displays, on the display screen of the display device or the like, a message for prompting the subject person to not move their face.

(Physical Configuration)

Figure 10:
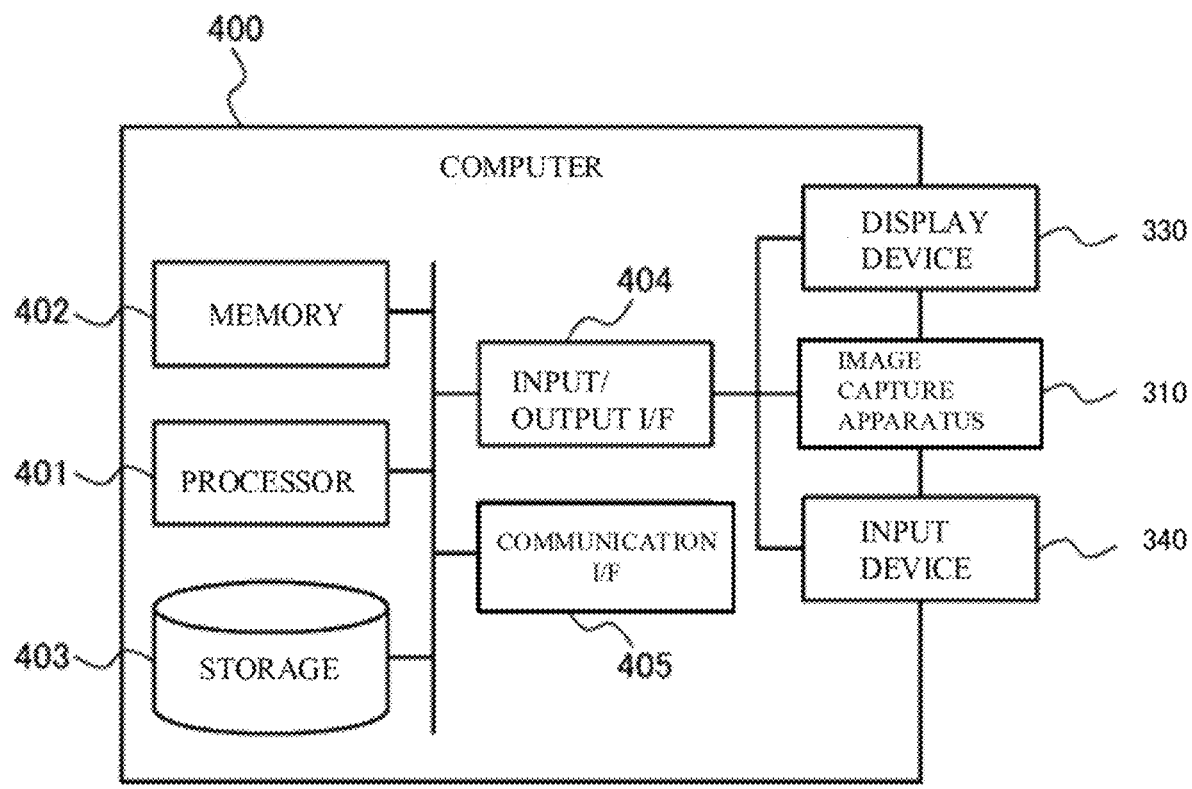
FIG. 10 is a block diagram showing an example of a computer that realizes the spoofing detection apparatuses according to the first to third example embodiments of the invention.

Here, a computer that realizes a spoofing detection apparatus by executing the program according to one of the first to third example embodiments will be described with reference to FIG. 10. FIG. 10 is a block diagram showing an example of a computer that realizes the spoofing detection apparatus according to one of the first to third example embodiments of the invention.

A computer 400 shown in FIG. 10 is, for example, a computer incorporated in a mobile terminal apparatus such as a mobile phone or a smartphone. As shown in FIG. 10, the computer 400 includes a processor 401, a memory 402, a storage 403, an input/output interface (input/output I/F) 404, and a communication interface (communication I/F) 405. The processor 401, the memory 402, the storage 403, the input/output interface 404, and the communication interface 405 are connected by a data transmission path (bus) 406 for mutually transmitting/receiving data. Note that the hardware configuration of the computer 400 is not limited to the configuration shown in FIG. 10.

The processor 401 is a computation processing apparatus such as a CPU (Central Processing Unit) or a GPU (Graphics Processing Unit). The memory 402 is a memory such as a RAM (Random Access Memory) or a ROM (Read Only Memory). The storage 403 is a storage apparatus such as an HDD (Hard Disk Drive), an SSD (Solid State Drive), or a memory card.

The memory 402 or the storage 403 stores a program for realizing the units that constitute a spoofing detection apparatus. As a result of the processor 401 executing the program, the units are realized, and various types of processing are executed. Here, a configuration may also be adopted in which, when executing the program, the processor 401 reads out the program to the memory 402 and then executes the program, or executes the program without reading out the program to the memory 402.

A configuration may also be adopted in which the above-described program is stored in one of various types of non-transitory computer-readable recording media, and is supplied to the computer 400. Examples of the non-transitory computer-readable recording medium include various types of tangible recording media.

Examples of the non-transitory computer-readable recording medium include a magnetic recording medium (such as a flexible disk, a magnetic tape, or a hard disk drive), a magnetooptical recording medium (such as a magnetooptical disk), a CD-ROM (compact disc read only memory), a CD-R (compact disc recordable), a CD-R/W (compact disc rewritable), and a semiconductor memory (such as a mask ROM, a PROM (programmable ROM), an EPROM (erasable PROM), a flash ROM, or a RAM).

In addition, the program may also be supplied to the computer 400 from one of various types of transitory computer-readable recording media. Examples of the transitory computer-readable recording medium include an electrical signal, an optical signal, and electromagnetic waves. The transitory computer-readable recording medium can supply the program to the computer via a wired communication path or a wireless communication path made of an electric wire, an optical fiber, or the like.

The input/output interface 404 is connected to the image capture apparatus 310, the display device 330, the input device 340, and the like. The display device 330 is a device for displaying a screen in accordance with rendering data processed by the processor 401, such as an LCD (Liquid Crystal Display) or a CRT (Cathode Ray Tube) display. The communication interface 405 transmits/receives data to/from an external apparatus. The communication interface 405 communicates with an external apparatus via a wired network or a wireless network, for example.

The image capture apparatus 310 is an apparatus for the user to shoot the face of a subject person, etc., or a subject person to shoot their own face, etc., such as a digital camera or a digital video camera. The input device 340 is a device for receiving a user's operation input, and is a keyboard, a touch sensor, a touch panel, or the like. For example, if the input device 340 is a touch panel, the input device 340 and the display device 330 may be integrated.

Note that the spoofing detection apparatus according to the example embodiment can also be realized by using items of hardware respectively corresponding to the units, instead of a computer in which the program is installed. Furthermore, a configuration may also be adopted in which a portion of the spoofing detection apparatus is realized by the program, and the remaining portion is realized by hardware.

The example embodiments described above can be partially or wholly realized by supplementary notes 1 to 12 described below, but the invention is not limited to the following description.

(Supplementary Note 1)

A spoofing detection apparatus comprising:
 a face image obtaining unit configured to obtain, from an image capture apparatus, a first image frame that includes a face of a subject person when light was emitted from a light-emitting apparatus associated with the image capture apparatus and a second image frame that includes the face of the subject person when the light-emitting apparatus was turned off;
 a face information extraction unit configured to extract information specifying a face portion of the subject person as first face information, from the first image frame, and extract information specifying a face portion of the subject person as second face information, from the second image frame;
 a feature calculation unit configured to extract a portion that includes a bright point formed by reflection in an iris region of an eye of the subject person, from the first image frame, based on the first face information, also extract a portion corresponding to the portion that includes the bright point, from the second image frame, based on the second face information, and calculate, based on the two extracted portions, a feature that is independent of a position of the bright point; and
 a spoofing determination unit configured to determine authenticity of the subject person captured by the image capture apparatus, based on the feature.

(Supplementary Note 2)

The spoofing detection apparatus according to Supplementary Note 1, further comprising:
 a shooting control unit configured to set a light-emitting period of the light-emitting apparatus and a shooting timing of the image capture apparatus.

(Supplementary Note 3)

The spoofing detection apparatus according to Supplementary Note 1 or 2,
 wherein the feature calculation unit calculates a second feature that reflects a three-dimensional shape of the face of the subject person, in addition to the feature that is independent of the position of the bright point, and
 the spoofing determination unit determines authenticity of the subject person captured by the image capture apparatus, based on the feature that is independent of the position of the bright point and the second feature.

(Supplementary Note 4)

The spoofing detection apparatus according to Supplementary Note 3,
 wherein the spoofing determination unit separately executes authenticity determination that is based on the feature that is independent of the position of the bright point and authenticity determination that is based on the second feature, calculates a score that indicates a possibility of being authentic every time authenticity determination is performed, and executes conclusive authenticity determination based on scores calculated in the respective instances of authenticity determination.

(Supplementary Note 5)

A spoofing detection method comprising:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of extracting a portion that includes a bright point formed by reflection in an iris region of an eye of the subject person, from the first image frame, based on the first face information, also extracting a portion corresponding to the portion that includes the bright point, from the second image frame, based on the second face information, and calculating, based on the two extracted portions, a feature that is independent of a position of the bright point; and (d) a step of determining authenticity of the subject person captured by the image capture apparatus, based on the feature.

(Supplementary Note 6)

The spoofing detection method according to Supplementary Note 5, further comprising:

(e) a step of setting a light-emitting period of the light-emitting apparatus and a shooting timing of the image capture apparatus.

(Supplementary Note 7)

The spoofing detection method according to Supplementary Note 5 or 6, wherein, in the (c) step, a second feature that reflects a three-dimensional shape of the face of the subject person is calculated, in addition to the feature that is independent of the position of the bright point, and in the (d) step, authenticity of the subject person captured by the image capture apparatus is determined based on the feature that is independent of the position of the bright point and the second feature.

(Supplementary Note 8)

The spoofing detection method according to Supplementary Note 7, wherein, in the (d) step, authenticity determination that is based on the feature that is independent of the position of the bright point and authenticity determination that is based on the second feature are separately executed, a score that indicates a possibility of being authentic is calculated every time authenticity determination is performed, and conclusive authenticity determination is executed based on scores calculated in the respective instances of authenticity determination.

(Supplementary Note 9)

A computer-readable recording medium that includes a program recorded thereon, the program including instructions that cause a computer to carry out:

(a) a step of obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;

(b) a step of extracting information specifying a face portion of the subject person as first face information, from the first image frame, and extracting information specifying a face portion of the subject person as second face information, from the second image frame;

(c) a step of extracting a portion that includes a bright point formed by reflection in an iris region of an eye of the subject person, from the first image frame, based on the first face information, also extracting a portion corresponding to the portion that includes the bright point, from the second image frame, based on the second face information, and calculating, based on the two extracted portions, a feature that is independent of a position of the bright point; and (d) a step of determining authenticity of the subject person captured by the image capture apparatus, based on the feature.

(Supplementary Note 10)

The computer-readable recording medium according to Supplementary Note 9, the program further including an instruction that causes a computer to carry out:

(e) a step of setting a light-emitting period of the light-emitting apparatus and a shooting timing of the image capture apparatus.

(Supplementary Note 11)

The computer-readable recording medium according to Supplementary Note 9 or 10, wherein, in the (c) step, a second feature that reflects a three-dimensional shape of the face of the subject person is calculated, in addition to the feature that is independent of the position of the bright point, and in the (d) step, authenticity of the subject person captured by the image capture apparatus is determined based on the feature that is independent of the position of the bright point and the second feature.

(Supplementary Note 12)

The computer-readable recording medium according to Supplementary Note 11, wherein, in the (d) step, authenticity determination that is based on the feature that is independent of the position of the bright point and authenticity determination that is based on the second feature are separately executed, a score that indicates a possibility of being authentic is calculated every time authenticity determination is performed, and conclusive authenticity determination is executed based on scores calculated in the respective instances of authenticity determination.

Although the present invention has been described above with reference to the example embodiments above, the invention is not limited to the above example embodiments. Various modifications understandable to a person skilled in the art can be made in configurations and details of the invention, within the scope of the invention.

INDUSTRIAL APPLICABILITY

As described above, according to the invention, during face authentication, spoofing detection can be executed without being affected by dependence on the position of a reflection bright point. The invention is useful for various systems in which face authentication is performed.

LIST OF REFERENCE SIGNS

101 User
102 Terminal apparatus equipped with camera when flash is on
103 Terminal apparatus equipped with camera when flash is off
105 Image when flash is on
106 Image when flash is off
201, 202 Portion of image of iris region
203, 204 Conventional feature calculated based on iris region
205, 206 feature calculated based on iris region according to present invention
300 Spoofing detection apparatus (first example embodiment)
301 Face image obtaining unit
302 Face information extraction unit
303 feature calculation unit
304 Spoofing determination unit
305 Shooting control unit
310 Image capture apparatus
320 Light-emitting apparatus
330 Display device
340 Input device
350 Spoofing detection apparatus (second example embodiment)
400 Computer
401 Processor
402 Memory
403 Storage
404 Input/output interface (Input/output I/F)
500 Terminal apparatus
701 Feature vector calculated based on iris region of real face
702 Feature vector calculated based on iris region of fake face

The invention claimed is:

1. A spoofing detection apparatus comprising:
at least one memory configured to store a program; and
at least one processor configured to run the program to execute:
obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
extracting information specifying a face portion of the subject person as first face information, from the first image frame, and extract information specifying a face portion of the subject person as second face information, from the second image frame;
extracting a first portion that includes a bright point formed by reflection in an iris region of an eye of the subject person, from the first image frame, based on the first face information;
extracting a second portion corresponding to the portion that includes the bright point, from the second image frame, based on the second face information; and
determining spoofing of the subject person captured by the image capture apparatus, based on the first portion and the second portion.

2. The spoofing detection apparatus according to claim 1, the processor configured to run the program to further execute:
calculating, based on the first portion and the second portion, a feature that is independent of a position of the bright point; and
determining spoofing of the subject person captured by the image capture apparatus, based on the feature.

3. The spoofing detection apparatus according to claim 1, the processor configured to run the program to further execute:
setting a light-emitting period of the light emitting apparatus and a shooting timing of the image capture apparatus.

4. The spoofing detection apparatus according to claim 1, wherein the processor configured to run the program to further execute:
calculating a second feature that reflects a three-dimensional shape of the face of the subject person, in addition to the feature that is independent of the position of the bright point, and
determining spoofing of the subject person captured by the image capture apparatus, based on the feature that is independent of the position of the bright point and the second feature.

5. The spoofing detection apparatus according to claim 4, wherein the processor configured to run the program to further execute:
executing spoofing determination that is based on the feature that is independent of the position of the bright point and spoofing determination that is based on the second feature, calculating a score that indicates a possibility of being authentic every time spoofing determination is performed, and executing conclusive spoofing determination based on scores calculated in the respective instances of spoofing determination.

6. A spoofing detection performed by a spoofing detection apparatus, the method comprising:
obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
extracting information specifying a face portion of the subject person as first face information, from the first image frame, and extract information specifying a face portion of the subject person as second face information, from the second image frame;
extracting a first portion that includes a bright point formed by reflection in an iris region of an eye of the subject person, from the first image frame, based on the first face information;
extracting a second portion corresponding to the portion that includes the bright point, from the second image frame, based on the second face information; and
determining spoofing of the subject person captured by the image capture apparatus, based on the first portion and the second portion.

7. The spoofing detection method according to claim 6, further comprising:
calculating, based on the first portion and the second portion, a feature that is independent of a position of the bright point; and
determining spoofing of the subject person captured by the image capture apparatus, based on the feature.

8. The spoofing detection method according to claim 6, further comprising:
setting a light-emitting period of the light emitting apparatus and a shooting timing of the image capture apparatus.

9. The spoofing detection method according to claim 6, further comprising:
calculating a second feature that reflects a three-dimensional shape of the face of the subject person, in addition to the feature that is independent of the position of the bright point, and
determining spoofing of the subject person captured by the image capture apparatus, based on the feature that is independent of the position of the bright point and the second feature.

10. The spoofing detection method according to claim 9, further comprising:
executing spoofing determination that is based on the feature that is independent of the position of the bright point and spoofing determination that is based on the second feature, calculating a score that indicates a possibility of being authentic every time spoofing determination is performed, and executing conclusive spoofing determination based on scores calculated in the respective instances of spoofing determination.

11. A non-transitory computer-readable recording medium that includes a program recorded thereon, the program including instructions that cause a computer to perform:
obtaining, from an image capture apparatus, a first image frame that includes a face of a subject person when light was emitted from a light-emitting apparatus associated with the image capture apparatus and a second image frame that includes the face of the subject person when the light-emitting apparatus was turned off;
extracting information specifying a face portion of the subject person as first face information, from the first image frame, and extract information specifying a face portion of the subject person as second face information, from the second image frame;
extracting a first portion that includes a bright point formed by reflection in an iris region of an eye of the subject person, from the first image frame, based on the first face information;
extracting a second portion corresponding to the portion that includes the bright point, from the second image frame, based on the second face information; and
determining spoofing of the subject person captured by the image capture apparatus, based on the first portion and the second portion.

12. The non-transitory computer-readable recording medium according to claim 11,
calculating, based on the first portion and the second portion, a feature that is independent of a position of the bright point; and
determining spoofing of the subject person captured by the image capture apparatus, based on the feature.

13. The non-transitory computer-readable recording medium according to claim 11, further comprising:
setting a light-emitting period of the light emitting apparatus and a shooting timing of the image capture apparatus.

14. The non-transitory computer-readable recording medium according to claim 11, further comprising:
calculating a second feature that reflects a three-dimensional shape of the face of the subject person, in addition to the feature that is independent of the position of the bright point, and
determining spoofing of the subject person captured by the image capture apparatus, based on the feature that is independent of the position of the bright point and the second feature.

15. The non-transitory computer-readable recording medium according to claim 14, further comprising:
executing spoofing determination that is based on the feature that is independent of the position of the bright point and spoofing determination that is based on the second feature, calculating a score that indicates a possibility of being authentic every time spoofing determination is performed, and executing conclusive spoofing determination based on scores calculated in the respective instances of spoofing determination.

* * * * *